United States Patent [19]

Debret et al.

[11] 4,364,149
[45] Dec. 21, 1982

[54] VARIABLE-PLAY TAKE-UP JOINT

[75] Inventors: Alain Debret, Colombes; Guy Soetaert, Les Clayes sous Bois, both of France

[73] Assignee: Regie Nationale des Usines Renault, Boulogne Billancourt, France

[21] Appl. No.: 226,849

[22] Filed: Jan. 21, 1981

[30] Foreign Application Priority Data

Feb. 7, 1980 [FR] France .................................. 80 02668

[51] Int. Cl.³ ............................................. E05D 13/02
[52] U.S. Cl. .................................................. 16/87 R
[58] Field of Search .............. 16/87, 377, 94 R, 94 D, 16/DIG. 32, DIG. 36, DIG. 37, DIG. 40, DIG. 41; 296/146; 411/546, 154, 155; 403/408, 409; 52/217; 49/475, 480, 481

[56] References Cited

U.S. PATENT DOCUMENTS

| | | | |
|---|---|---|---|
| 3,468,509 | 9/1969 | Foltz | 16/94 R X |
| 3,708,192 | 1/1973 | Klebba et al. | 296/146 X |
| 3,727,349 | 4/1973 | Bainbridge | 49/411 |
| 4,288,887 | 9/1981 | Johnson et al. | 16/87 R |

FOREIGN PATENT DOCUMENTS 2280522  2/1976  France .

*Primary Examiner*—Paul A. Bell
*Assistant Examiner*—John S. Brown
*Attorney, Agent, or Firm*—Oblon, Fisher, Spivak, McClelland & Maier

[57] ABSTRACT

Variable-play take-up joint, in particular for an automobile is disclosed. The joint is placed between the support element and the part to be mounted, said part being affixed along a plane different from the joint plane. The joint includes elastic play take-up tongues which push the joint against the support element, and a peripheral rim on three of its sides.

4 Claims, 10 Drawing Figures

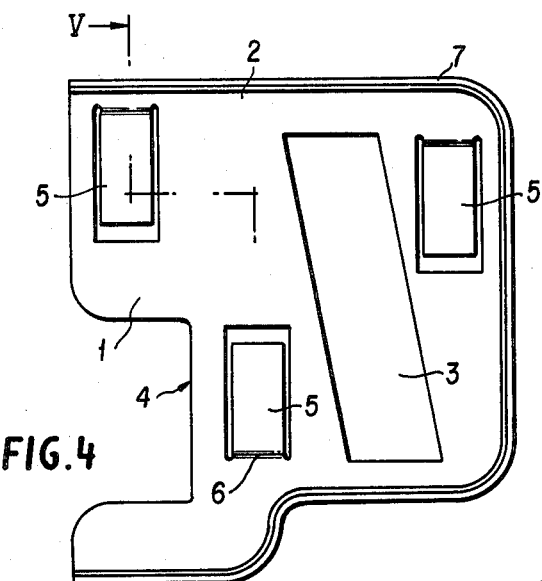
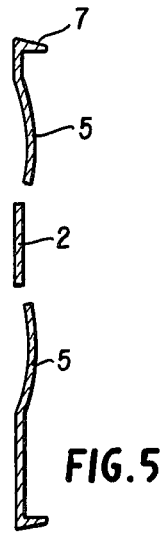
FIG.4
FIG.5
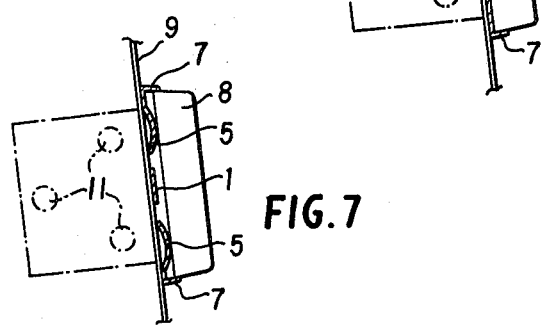
FIG.6
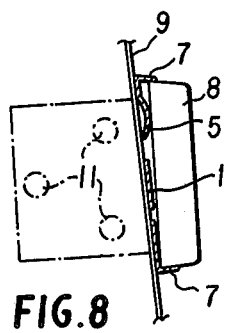
FIG.7
FIG.8
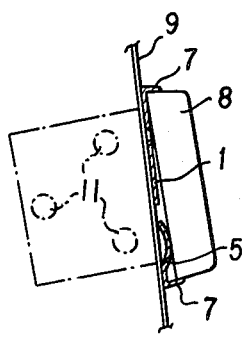
FIG.9
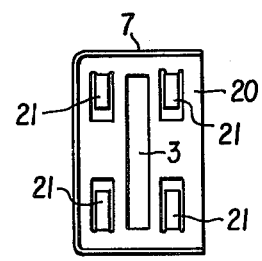
FIG.10

VARIABLE-PLAY TAKE-UP JOINT

BACKGROUND OF THE INVENTION

1. Field of the Invention

The present invention relates to a variable-play take-up joint placed between a support element, which may be an automobile body panel, and a part to be mounted, which is affixed along a plane different from that of the joint's plane.

2. Description of the Prior Art

Joints inserted between accessories and a body onto which they are attached in order to avoid contact between these accessories, which may be metallic, and the body paneling, which might cause local corrosion of the body, are known. In addition, these joints assure a certain water-tightness. When the accessories are attached on the same plane as the joint, the latter is clasped between the two joined elements, and there are no particular problems of appearance or tightness. On the other hand, when, for technical reasons, it is necessary to have an attachment on a plane different from that of the joint, for example essentially perpendicular to the latter, the various functional adjustments may cause the accessory's face to no longer be fully in contact with the support body, which means that the joint is no longer correctly held and that it can no longer perform its functions of appearance and tightness.

SUMMARY OF THE INVENTION

The object of the present invention is therefore to achieve a variable-play take-up joint which makes it possible to affix a part onto a plane different from the joint plane, while at the same time assuring the desired protection, appearance and tightness of the joint.

To this end, the invention involves a variable-play take-up joint placed between the support element, in particular an automobile body panel, and the part to be mounted, said part being affixed along a plane different from the joint plane, said joint having in its primary plane a slot for the passage of the attachment face and at least three elastic play take-up tongues which hold the joint against the support element and a peripheral rim on its sides serving as a tightness barrier and a cover for the joint plane, the length of said rim being greater than the maximum possible value of the joint between the part to be mounted and the support element.

According to a preferred embodiment of the invention, the tongues each consist of a convex, circular-contour element attached to the joint plane on one side only, and the plastic joint is obtained directly by molding.

Such a joint according to the invention has the advantage of fitting the play scarfs between the support element and the part to be mounted and, in addition, makes it possible to assure the desired protection, appearance, and tightness.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 4 is a front view of the play take-up joint as placed in FIG. 2, FIG. 5 is a cross-section VV of FIG. 4, FIGS. 6, 7, 8 and 9 show different cases of mounting of the play take-up joint from the embodiment of the preceding cases in views along the arrow VI of FIG. 3, FIG. 10 shows a front view of another embodiment of the play take-up joint.

DETAILED DESCRIPTION OF THE PREFERRED EMBODIMENTS

Figure 1:
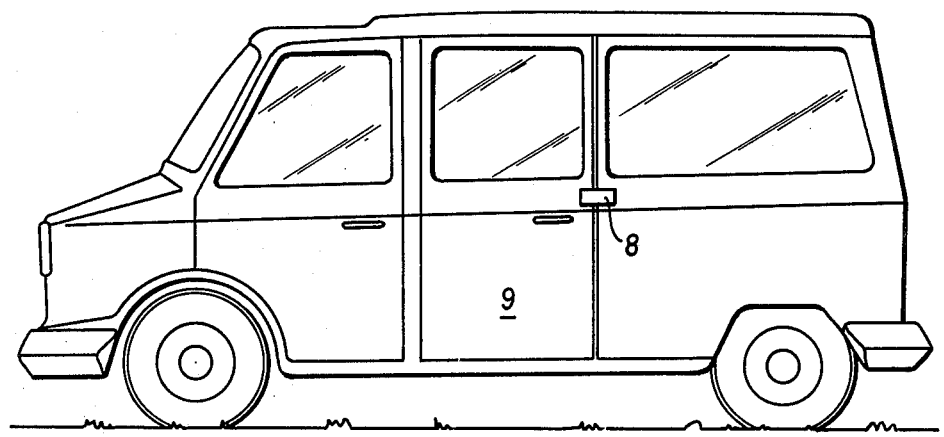
FIG. 1 shows a vehicle onto which is mounted a play take-up joint according to the invention.

The play take-up joint 1 shown in FIGS. 4 and 5 of a plastic material and includes a joint plane 2 in which are arranged a slot 3 for the passage of an attachment face and a cut 4 adapted for the device in which the joint 1 is to be mounted. In addition, this joint plane 2 has three play take-up elastic tongues 5, each of which consist of a convex, circular-contour rectangular element attached to the joint plane 2 on one side 6 only. Finally, this joint plane 2 is surrounded by a peripheral rim 7 which, in the example shown, is formed on only three sides.

Figure 2:
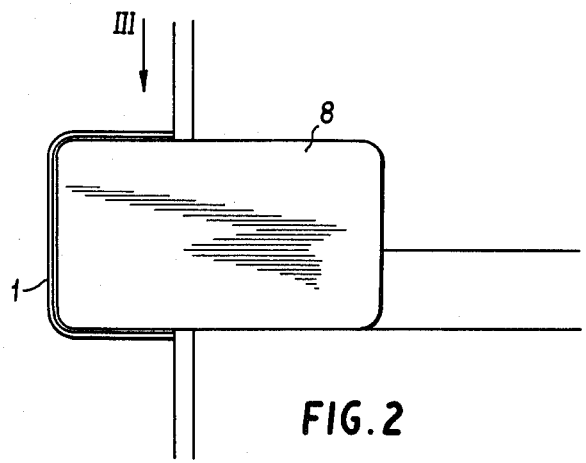
FIG. 2 shows a detail of FIG. 1 in which the play take-up joint is mounted.
Figure 3:
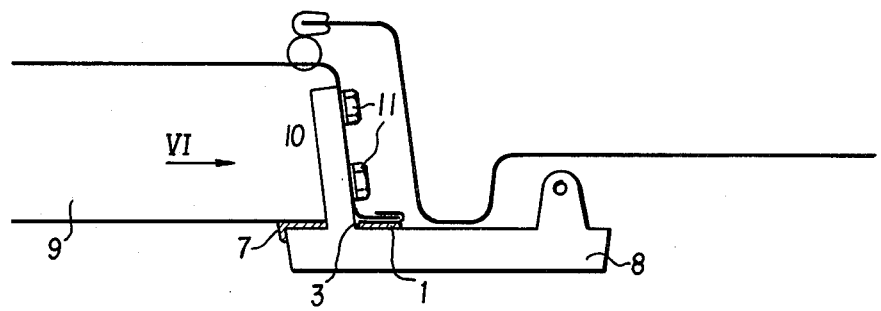
FIG. 3 is a top view of the detail of FIG. 2, seen along the arrow III of FIG. 2.

The vehicle shown in FIG. 1 has a sliding-door clearance mechanism which utilizes a linkage part 8. This linkage part is seen in greater detail in FIGS. 2 and 3 in which it is possible to distinguish the play take-up joint 1 placed between the linkage part 8 and the sliding door 9. The slot 3 of the joint 1 allows the attachment face 10 of the linkage part 8 to pass through the joint, this face 10 being attached to said sliding door 9 by three screws 11. The peripheral rim 7 of the joint 1 surrounds the linkage part 8 on three sides.

FIGS. 6, 7, 8 and 9 represent the various possible ways of the mounting of the joint 1 on the sliding door 9. In the case of FIG. 6, the play between the linkage part 8 and the sliding door 9 has a constant value equal to the thickness of the joint 1. In the case of FIG. 7, the play between the linkage part 8 and the sliding door 9 has a constant value which is the maximum possible value of the device in question. In this case, the peripheral rim again surrounds over the linkage part 8, which enables the joint 1 to fulfill its functions of appearance and tightness.

In the case of FIG. 8, the play between the linkage part 8 and the sliding door 9 has a variable value going from a minimum value equal to the thickness of the joint 1 up to a maximum possible value in the device in question. This maximum play is found at the upper part of the linkage part 8, and, in this case, the peripheral rim 7 again surrounds over the linkage part 8. In the case of FIG. 9, the play between the linkage part 8 and the sliding door 9 has a variable value between limits identical to those in the case of FIG. 8. In this case, the maximum play is found at the lowest part of the linkage part 8, and the peripheral rim 7 again surrounds over the linkage part 8.

In FIGS. 7, 8 and 9 is seen the role of the elastic play take-up tongues 5, which always push the joint plane 2 against the support which, in our example, is the sliding door 9. In addition, as the peripheral rim 7 always surrounds over the linkage part 8, whatever the mounting case, the placement of the joint 7 is thus perfectly assured. The joint can therefore fulfill its functions of tightness and appearance.

FIG. 10 shows another embodiment of a play take-up joint 20 according to the invention, in which there are four elastic play take-up tongues 21.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A variable play take-up joint adapted to be positioned between a support element and a mounted part attached to said support element along a plane different from the plane of said joint, said joint comprising:

a planar member;

a slot in said planar member for the passage of a portion of said mounted part;

at least three elastic play take-up tongues fixed to said planar member for biasing said planar member towards said support element; and a peripheral rim on said planar member, the height of said rim being greater than the maximum extension of said tongues from said planar member.

2. The joint of claim 1 wherein each of said tongues comprise a rectangular member attached to said planar member at one end thereof and having a circular convex contour.

3. The joint of claims 1 or 2 comprising four of said tongues.

4. The joint of claims 1 or 2 formed of a single piece of molded plastic material.

* * * * *